United States Patent
Kölhi et al.

(10) Patent No.: US 10,999,396 B2
(45) Date of Patent: May 4, 2021

(54) APPARATUS AND METHOD FOR CACHING DATA

(71) Applicant: TELEFONAKTIEBOLAGET LM ERICSSON (PUBL), Stockholm (SE)

(72) Inventors: Johan Kölhi, Stockholm (SE); Michael Huber, Stockholm (SE); Andreas Ljunggren, Stockholm (SE); John Orre, Stockholm (SE); Robert Skog, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 226 days.

(21) Appl. No.: 15/557,275

(22) PCT Filed: Mar. 12, 2015

(86) PCT No.: PCT/EP2015/055217
§ 371 (c)(1),
(2) Date: Sep. 11, 2017

(87) PCT Pub. No.: WO2016/141993
PCT Pub. Date: Sep. 15, 2016

(65) Prior Publication Data
US 2018/0063275 A1    Mar. 1, 2018

(51) Int. Cl.
*H04L 29/08*    (2006.01)
*H04L 29/06*    (2006.01)
*H04L 12/851*    (2013.01)

(52) U.S. Cl.
CPC ...... *H04L 67/2852* (2013.01); *H04L 63/0428* (2013.01); *H04L 63/166* (2013.01); *H04L 67/2842* (2013.01); *H04L 47/2483* (2013.01)

(58) Field of Classification Search
CPC ............. H04L 67/2852; H04L 47/2483; H04L 63/0428; H04L 63/166
See application file for complete search history.

(56) References Cited

U.S. PATENT DOCUMENTS

| 2003/0065917 A1 | 4/2003 | Medvinsky et al. |
| 2004/0015725 A1 | 1/2004 | Boneh et al. |

(Continued)

FOREIGN PATENT DOCUMENTS

| EP | 2 800 310 A1 | 11/2014 |
| WO | 2015002580 A1 | 1/2015 |

OTHER PUBLICATIONS

International Search Report and Written Opinion issued in Application No. PCT/EP2015/055217 dated Nov. 27, 2015, 11 pages.

(Continued)

*Primary Examiner* — June Y Sison
*Assistant Examiner* — Steven C Nguyen
(74) *Attorney, Agent, or Firm* — Patent Portfolio Builders, PLLC

(57) ABSTRACT

A method in a cache node (30) of a network comprises monitoring a secure data stream being received at the cache node from a server node, and detecting from one or more data chunks of the secure data stream that the secure data stream contains a data object that has been previously received and cached at the cache node, and sending a notification signal to the server node that the data object has been previously cached. The method may further comprise receiving one or more encryption header portions (e.g. TLS headers) from the server node, inserting a previously cached data chunk corresponding to each of the one or more encryption header portions into the data stream, and sending the data stream to a client device.

18 Claims, 9 Drawing Sheets

(56) References Cited

U.S. PATENT DOCUMENTS

| | | | | |
|---|---|---|---|---|
| 2004/0103202 A1* | 5/2004 | Hildebrand | .......... | G06F 21/6209 709/229 |
| 2011/0099224 A1* | 4/2011 | Samuels | ............. | H04L 67/2842 709/203 |
| 2012/0166586 A1* | 6/2012 | Sheffi | .................. | H04L 67/2819 709/217 |
| 2013/0326133 A1* | 12/2013 | Lee | ..................... | G06F 12/0875 711/108 |
| 2014/0089467 A1* | 3/2014 | Beck | ....................... | H04L 67/02 709/219 |
| 2014/0310374 A1* | 10/2014 | Lee | ......................... | H04L 45/02 709/213 |
| 2015/0304444 A1* | 10/2015 | Lundborg | ............. | G06F 16/284 709/213 |
| 2016/0179581 A1* | 6/2016 | Soundararajan | ...... | G06F 9/5033 718/104 |
| 2017/0078437 A1* | 3/2017 | Rhea | ................... | H04L 67/2847 |

OTHER PUBLICATIONS

Office Action issued in corresponding EP Application No. 15711689.8 dated Nov. 26, 2018; 8 pages. All references cited therein have been previously made of record.

* cited by examiner

APPARATUS AND METHOD FOR CACHING DATA

CROSS REFERENCE TO RELATED APPLICATION(S)

This application is a 35 U.S.C. § 371 National Stage of International Patent Application No. PCT/EP2015/055217, filed Mar. 12, 2015, designating the United States, the disclosure of which is incorporated by reference.

TECHNICAL FIELD

The present invention relates to an apparatus and method for caching data, and in particular for caching streamed data that is encrypted, for example encrypted using transport layer security, TLS.

BACKGROUND

With the increasing use of software applications (referred to as "apps") designed to run on smartphones, tablets and other mobile device, users are increasingly interacting with their smartphones to access content from service providers. Accessing such content can typically be slow when applications need to contact a server to obtain information. As an example, a Facebook™ application may be fast when scrolling is undertaken, but when a feed is to be updated, a message saying "updating . . . " may appear for several seconds before the feed updates. Another example is a bank application whereby the user interface may be quick and responsive within the application itself, but as soon as the user tries to access his or her transactions, several seconds will lapse before the information is actually shown on the screen.

The latency experienced by the user can be divided into three categories: latency that comes from execution speed on the user device itself, latency that comes from the wireless network, i.e., the Radio Access Network (RAN), and latency that comes from the network connecting the RAN with the providers of services, e.g., internet. The first type of latency can be more or less eliminated by using a well programmed native application on the device. In the case of a web application the JavaScript code will execute somewhat slower but should still not be generating latencies that are in the order of seconds. The latency for the wireless network can be significant, but modern wireless access technologies have greatly reduced latencies. The remaining latency is that of the Internet itself, i.e., the round-trip-time from the cellular network to the server that hosts the content or provides a service and back to the cellular network again. As wireless access technologies have become faster, the Internet latency is starting to dominate.

Caching of data being streamed is a technology that may be used to speed up web site access and reduce network usage, for example by caching certain sections of the web sites being accessed, or caching streams of data that are accessed on a frequent basis.

However, it is becoming increasingly more common to encrypt web traffic, for example using secure communication protocols such as transport layer security, TLS. At present, this makes caching of content impossible. This presents a problem for operators that have caching proxies, since the TLS traffic will increase the load on the existing networks, and all traffic will be seen as noise, such that no optimization or caching can take place.

Content providers (or the origin sites) have a preference to use TLS since it allows them to have better control of the traffic sent to, or received from their customers. Third parties are unable to interfere with the traffic since it is encrypted, for example digitally signed, and therefore any manipulation of the traffic breaks the security immediately.

With increasing numbers of sites changing to use encryption, this is creating a problem for operators, since existing caching technologies, such as transparent internet caching (TIC) is no longer able to work with the streaming of encrypted data. This threatens to make operators effectively bitpipe content providers, or to depend on other players to provide content delivery network (CDN) solutions.

SUMMARY

It is an aim of the present invention to provide a method and apparatus which obviate or reduce at least one or more of the disadvantages mentioned above.

According to a first aspect, there is provided a method in a cache node of a network. The method comprises monitoring a secure data stream being received at the cache node from a server node, and detecting from one or more data chunks of the secure data stream that the secure data stream contains a data object that has been previously received and cached at the cache node. A notification signal is sent to the server node that the data object has been previously cached.

According to another aspect, there is provided a method in a server node of a network. The method comprises streaming secure data relating to a data object via a cache node to a client device, and receiving a notification signal from the cache node, the notification signal indicating that the secure data being streamed comprises a data object that has previously been cached at the cache node. The method further comprises ceasing to stream one or more remaining data chunks of the data object in response to receiving the notification signal, and sending one or more encryption header portions relating to each of the one or more remaining data chunks of the data object to the cache node.

According to another aspect, there is provided a cache node for a network. The cache node comprises a monitoring unit adapted to monitor a secure data stream being received at the cache node from a server node, and a processing unit adapted to detect from one or more data chunks of the secure data stream that the secure data stream contains a data object that has been previously received and cached at the cache node. A sending unit is adapted to send a notification signal to the server node that the data object has been previously cached.

According to another aspect, there is provided a server node for a network. The server node comprises a sending unit adapted to stream secure data relating to a data object via a cache node to a client device. A receiving unit is adapted to receive a notification signal from the cache node, the notification signal indicating that the secure data being streamed comprises a data object that has previously been cached at the cache node. A processing unit is adapted to control the sending unit to cease streaming one or more remaining data chunks of the data object in response to receiving the notification signal. The sending unit is further adapted to send one or more encryption header portions relating to each of the one or more remaining data chunks of the data object to the cache node.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

The examples of the embodiments described below allow operators that wish to use secure communication or encryption, for example encryption based on a Transport Layer Security (TLS) protocol layer, to cache data being streamed. Certain embodiments also allow an origin site to retain control of the handling of traffic to or from a cache node. Although the embodiments below will be described in the context of using TLS as the form of secure communication, it is noted that other forms of secure communication may also be employed.

Figure 1:
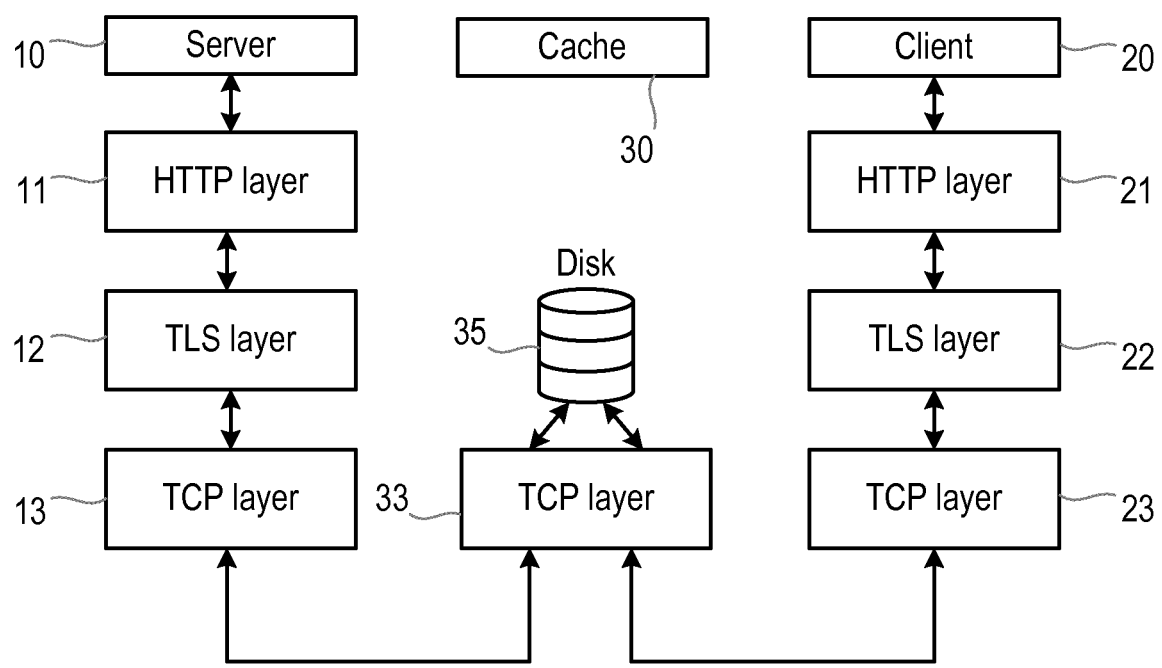
FIG. 1 shows an example of a network.

FIG. 1 shows an example of a network comprising a server node 10 (for example a content provider or an origin site) and a client device 20, which stream data between each other via a cache node 30. Examples of client devices 20 include a wireless device, a mobile phone, a smart phone, a personal digital assistant (PDA), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A client device 20 may also be referred to as user equipment (UE), a station (STA), a device, or a terminal in some embodiments.

FIG. 1 illustrates an example of the various protocol layers that may be used within the various nodes. For example, the server node 10 operates using a Hypertext Transfer Protocol (HTTP) layer 11, a Transport Layer Security (TLS) layer 12, and a Transport Control Protocol (TCP) layer 13. Likewise, the client device 20 is shown as operating using a HTTP layer 21, a TLS layer 22 and a TCP layer 23. The cache node 30 is shown as caching data at a TCP layer 33, for example using a memory unit 35.

As will be described in greater detail later in the application, the embodiments described herein tag the TLS (or other encrypted) stream of data on the TCP level with object markers, for example using one or more of the unused TCP flags, so that the nodes can determine where a cashable data object starts and stops. Because user unique data parts need to be transported in the cashable data object, the embodiments handle data objects as a plurality of data chunks, which may then be inserted by a cache node in the appropriate locations within a data stream.

Figure 2:
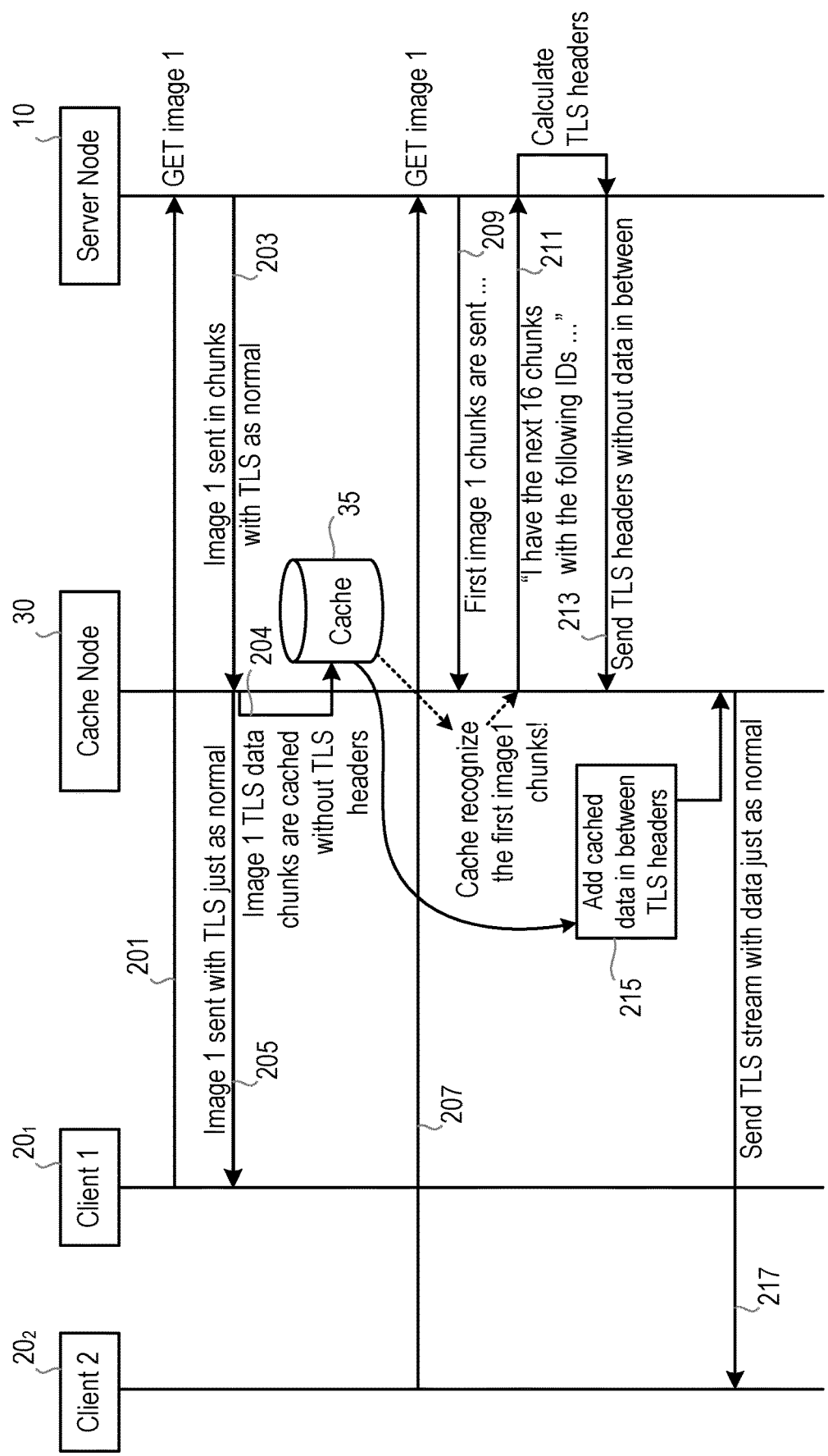
FIG. 2 shows an example of signaling in a network, according to an embodiment.

To help provide an overview of the embodiments that will be described later, FIG. 2 shows a signaling diagram illustrating the various messages that may be exchanged between nodes in a network, for example a server node 10, a cache node 30 and client devices 20, for example a first client device $20_1$ and a second client device $20_2$.

If it is assumed that the first client device $20_1$ wishes to download a first image, Image-1, from a content provider such as the server node 10 (or origin site), the first client device $20_1$ sends a request message 201 to the server node 10, requesting that content (e.g. Image-1) is delivered from the server node 10 to the first client device $20_1$. For example, the request message may comprise a "GET image 1" message. In response the server node 10 sends the first image, Image-1, via the cache node 30 to the first client device $20_1$. The server node 10 sends Image-1 as a data stream 203, which comprises the image data of the first image partitioned into one or more data chunks encrypted as normal, for example using TLS.

If it is assumed that this is the first time that cache node 30 has received this first image, Image-1, then upon receiving the data stream 203 corresponding to the first image, Image-1, in addition to forwarding the data stream of Image-1 to the first client device $20_1$ (shown as the data stream 205), the cache node 30 may be adapted to store the one or more data chunks which constitute the first image at the cache node 30, for example in a memory unit 35 during step 204. As such, the data chunks corresponding to Image-1 are available at the cache node 30 for future use, for example in the event that the first image, Image-1, is subsequently streamed through the cache node 30. In one example, the data chunks corresponding to Image-1 are stored without any of their associated TLS header portions. The data chunks may be stored in their encrypted format, in which case the cache node may not be able to read the data chunks, but just store them as chunks of encrypted user data. The encryption may comprise, for example, an object encryption with a common key, or a forced key exchange from the server side (such that the stream key will be identical for the cached data chunks). In one embodiment a hash function may be stored with a data chunk, to enable the correct data chunk to be found or located at a later time, that is, when the cached data chunk is to be inserted into a data stream, as will be discussed below. The data chunk may also be stored with information about which server it came from, which can be advantageous to reduce the risk of false positives.

It is noted that the cache node 30 may be adapted to store the data chunks during normal usage, i.e. while the data stream 205 is being sent to the client device $20_1$, or stored prior to the data stream 205 being sent, or stored after the data stream 205 is sent, or any partial combination thereof.

Next, if it is assumed that a second client device $20_2$ subsequently wishes to retrieve the first image, Image-1, from the server node 10, the second client device $20_2$ may also send a "GET image 1" request message 207 to the server node 10. In response, the server node 10 begins to send the first image 1 as a stream of data chunks, shown as data stream 209. The start of this procedure may be the same as the start of the procedure described above for data stream 203. Upon receiving the data stream 209, the cache node 30 monitors the secure data stream that is being received. If the cache node 30 recognizes that the data stream being received corresponds to that of Image-1, for example by determining this from one or more of the initial data chunks received, the cache node 30 may be adapted to then send a notification signal 211 to the server node 10, informing the server node 10 that the cache node 30 has previously received and cached data chunks corresponding to Image-1. For example, the notification signal 211 may inform the server node 10 that the cache node 30 already has one or more remaining data chunks for Image-1 stored at the cache node 30. In one example, the notification signal 211 informs the server node 10 that the cache node has X remaining data chunks having X corresponding identifiers. In one example this may involve sending X IDs, where each ID is the result of a hash of the data chunk itself (which the cache node generated when previously caching the data chunk).

In response to receiving the notification signal 211 the server node 10 may be adapted to calculate corresponding TLS headers for each of the remaining data chunks that are stored at the cache node 30. The TLS headers may be calculated at the server 10 by using the original data (image/contents). In one example this involves using the IDs received from the cache node 30, for example matching the received IDs against a list of IDs already stored in the server node, relating to respective data chunks or TLS headers. Then, instead of continuing to send data chunks to the cache node 30, the server node 10 sends the TLS headers instead, shown as data stream 213, i.e. without the intervening data itself.

Upon receiving the TLS headers from the server node 10, the cache node 30 is then able to add or insert the respective data in between the TLS headers, as shown in step 215, using the data chunks it has previously cached. The cache node 30 is then able to send the stream of data, as normal, to the second client device 20$_2$, illustrated by data stream 217. The data chunks may be merged into the data stream dynamically, or on the fly, such that a stream of cached data chunks stored at the cache node 10 are merged with a stream of TLS headers received from the server 10, as the data stream is being streamed to the client device 20$_1$.

From the above it can be seen that this embodiment adds a control link between the cache node 30 and the origin site, i.e. the server node 10. The cache node 30 can detect recognized transmitted chunks and send back information to the origin site about already cached chunks of data. If the origin site recognizes this as already cached, it will just send the TLS headers for each data chunk and the cache node will add the data part on the fly.

By allowing the server node 10 (origin site) to calculate the TLS headers that are to be used between the data parts, this enables control to be maintained from the server node 10. In addition to allowing a stream of data to be cached, it provides manipulation protection since all communication will be secure, for example signed digitally. Maintaining control at the server node 10 also enables the server node 10 to bypass the cache node 30, if it decides to do so. For example, the server node 10 may continue to send the full data stream rather than just the TLS headers, such that the session continues as normal.

The client devices 20 themselves see no difference, and as such they do not require any change. This has an advantage that the last stage will be standards compliant, while the origin-to-cache-link can be a proprietary protocol or modified TLS.

Figure 3:
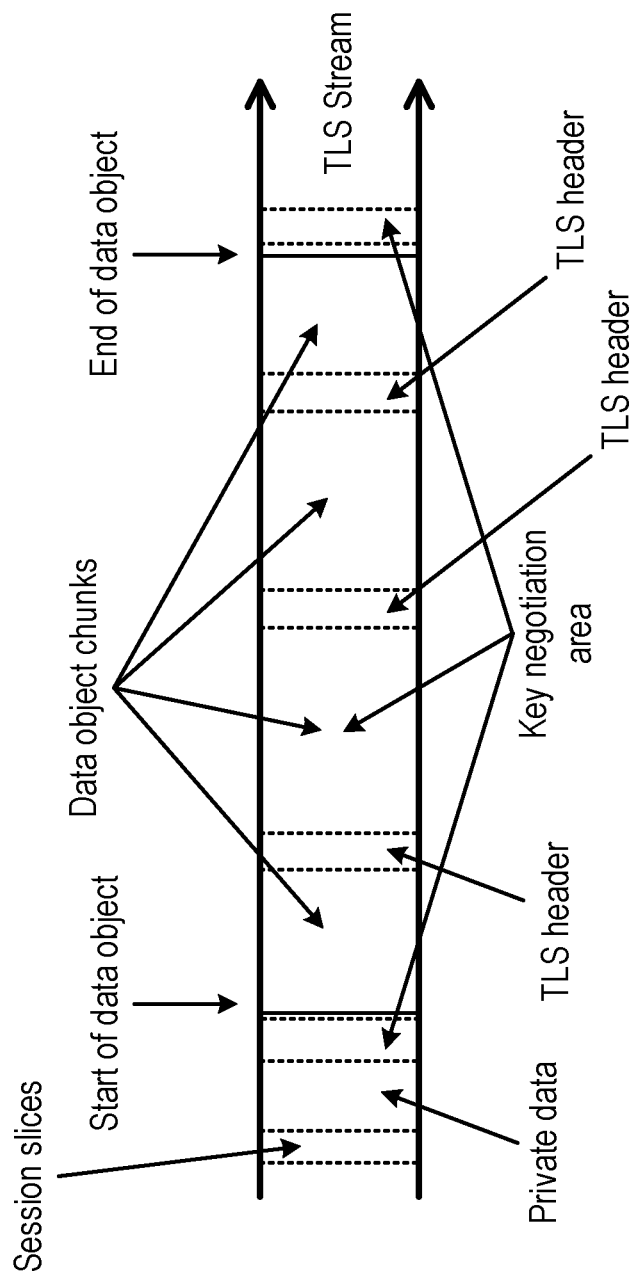
FIG. 3 shows a data signal according to an embodiment.

FIG. 3 shows an example of a data object, for example corresponding to Image-1 described in FIG. 2, and the plurality of data object chunks that may be used in conjunction with TLS headers to cache a secure data stream (for example a TLS stream) at a cache node. The TLS headers may be used to indicate where the start of each data chunk is to be inserted.

Next a more detailed explanation of various embodiments will be provided. And in particular the method steps that may be performed at the different nodes.

Figure 4:
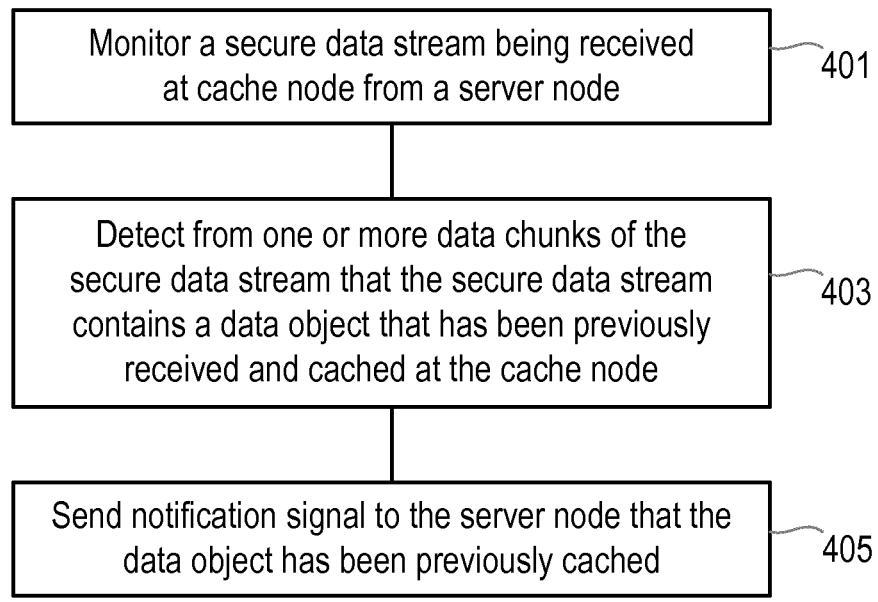
FIG. 4 shows an example of a method in a cache node according to an embodiment.

FIG. 4 shows an example of a method performed at a cache node of a network, for example the cache node 30 of FIGS. 1 and 2 above (and FIG. 10 below), when receiving a secure data stream that has previously been cached at the cache node.

The method comprises monitoring a secure data stream being received at the cache node from a server node, step 401, and detecting from one or more data chunks of the secure data stream that the secure data stream contains a data object that has been previously received and cached at the cache node, step 403. In response to detecting, the method comprises sending a notification signal to the server node that the data object has been previously cached, step 405.

The notification signal is for alerting the server node that the data object being streamed to the cache node, for example an image file, has previously been cached at the cache node. This allows data streaming from that point forward to be switched to data that has been already cached at the cache node.

Figure 5:
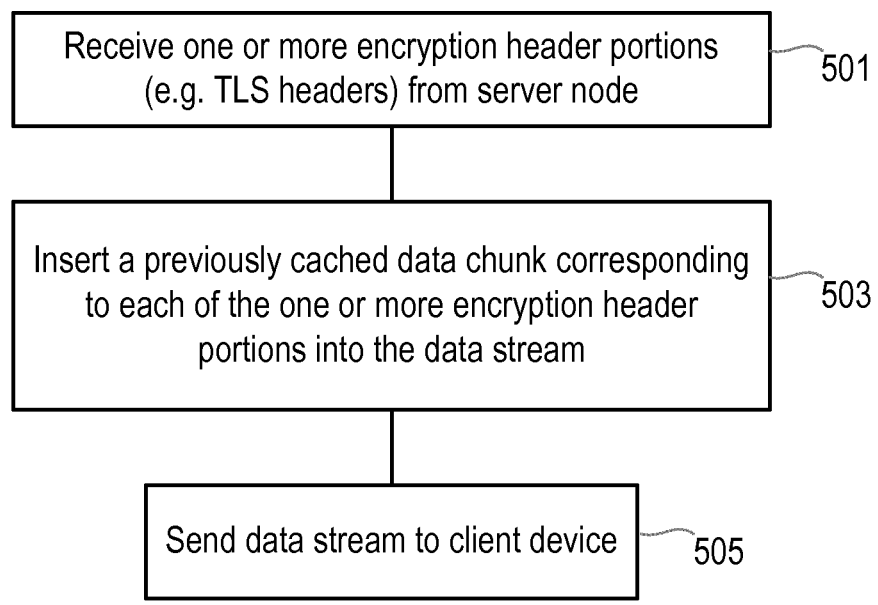
FIG. 5 shows an example of a method in a cache node according to an embodiment.

Referring to FIG. 5, the method performed at a cache node may further comprise receiving one or more encryption header portions from the server node (for example receiving TLS headers), step 501, and inserting a previously cached data chunk corresponding to each of the one or more encryption header portions into the data stream, step 503, and sending the data stream to a client device, step 505.

Each encryption header portion may relate to a corresponding data chunk that has been previously cached by the cache node, and which is to be inserted into the data stream.

The step of detecting whether the data object has been previously stored in the cache node may comprise detecting that a data object flag is set, and determining whether a file identifier indicated by the data object flag is already stored in the cache node. The data object flag may be used to identify the start of a data object and the end of a data object.

In one example the encryption header portions comprise transport layer security, TLS, header portions corresponding to a TLS layer.

In one example, the data object flag comprises a flag of a transport control protocol, TCP, header. For example, TCP header data comprises many different flags that may be set, but it also comprises around 80 bits of flags which are reserved and unused. Therefore, in one example two of these bits can be used to flag the beginning and end of a data object.

From the above it can be seen that when the TCP layer on the cache node sees that a data object flag is suddenly set, it checks if the file ID that the flag indicates is already in the cache node.

If the file ID is stored, it signals upstream that the file (e.g. a previously cached image file) is available. The server layer can then take a decision to stop sending the file and let the cache do its job, while the server layer only sends the slice data needed to keep the session alive (the slice data being, for example, the TLS headers.

When the data object flag is set (indicating that the data stream corresponds to a cacheable data object), and it is determined that the file ID is not stored, the cache node may take a decision relating to whether or not it should save the file, and then sends the file downstream.

Thus, the method performed at the cache node may comprise, upon detecting that the secure data stream being monitored does not relate to a data object that has been previously cached at the cache node, comprise the steps of storing one or more data chunks corresponding of the data object, without any corresponding encryption header portions, in addition to sending the data stream to a client device.

Figure 6:
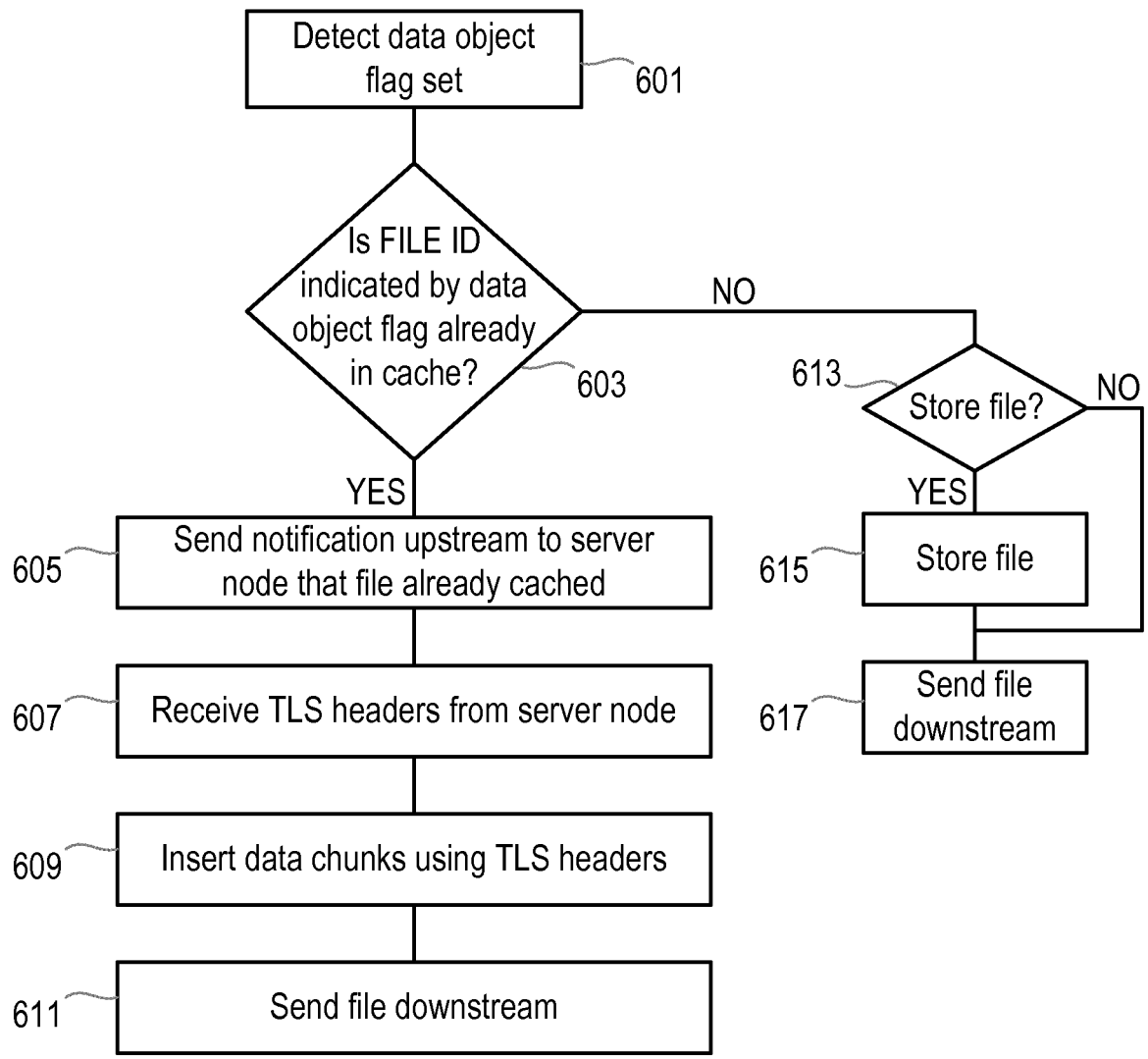
FIG. 6 shows an example of a method in a cache node according to an embodiment.

FIG. 6 shows the steps that may be performed in a cache node according to another embodiment. In step 601, the cache node detects that a data object flag is set (thus detecting the start of a data object). The cache node then checks whether the File ID indicated by the data object flag is already stored in the cache, step 603. If not, the cache node decides in steps 613 and 615 whether to store the data object (file) in addition to sending the data object downstream, for example to a client device, step 617. As mentioned above, the data object may be stored prior to the data object being sent downstream, during, or afterwards, or any combination thereof.

If it is determined in step 603 that the data object has been previously stored, the cache node sends a notification upstream to the server node, indicating that the data object (file) has already been cached, step 605. The cache node will then receive TLS headers from the server node, step 607. The cache node is then able to insert data chunks using the received TLS headers, step 609, and send the file downstream, step 611, for example to a client device.

Figure 7:
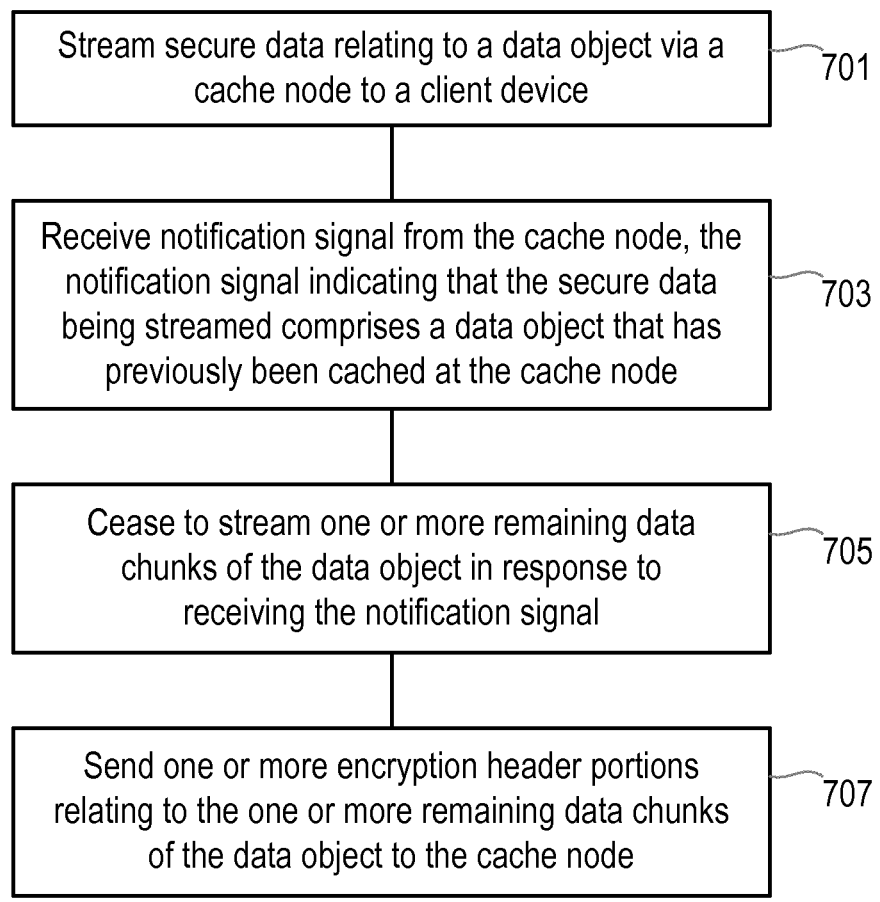
FIG. 7 shows an example of a method in a server node according to an embodiment.

FIG. 7 shows an example of a method performed by another embodiment in a server node of a network, for example the server node 10 of FIGS. 1 and 2 above (and FIG. 11 below).

The method comprises streaming secure data relating to a data object via a cache node to a client device, step 701. In step 703, a notification signal is received from the cache node indicating that the secure data being streamed comprises a data object that has previously been cached at the cache node. The method comprises ceasing to stream one or more remaining data chunks of the data object in response to receiving the notification signal, step 705, and then sending one or more encryption header portions (e.g. TLS headers) relating to each of the one or more remaining data chunks of the data object to the cache node, step 707.

Sending the TLS headers has the benefit of enabling the cache node to insert previously cached data chunks on the fly to reconstitute the data stream.

The method at the server node may further comprise, upon receiving the notification signal from the cache node, the steps of determining which encryption header portions relate to the one or more remaining data chunks of the data object, using one or more corresponding data chunk identifiers received from the cache node with the notification signal. In one example, this comprises the server node determining the TLS headers, but only transmitting the TLS headers, and not the data part, such that the TLS headers may be merged with the correct data part in a cache node.

Next, there will be described examples of methods that may be performed at a server node or origin site, for example to configure data objects such that they are suitable for being cached in the manner described in the Figures above.

In a HTTP layer at a server node, for example the HTTP layer 11 of FIG. 1, a HTTP server may be configured to inform the underlying layer, for example the TLS layer 12 of FIG. 1, that a data object is being sent, that is suitable for caching. This information may be conveyed in different ways. In one example, an extra function is provided in the TLS library, which may be used to receive a file pointer.

Figure 8:
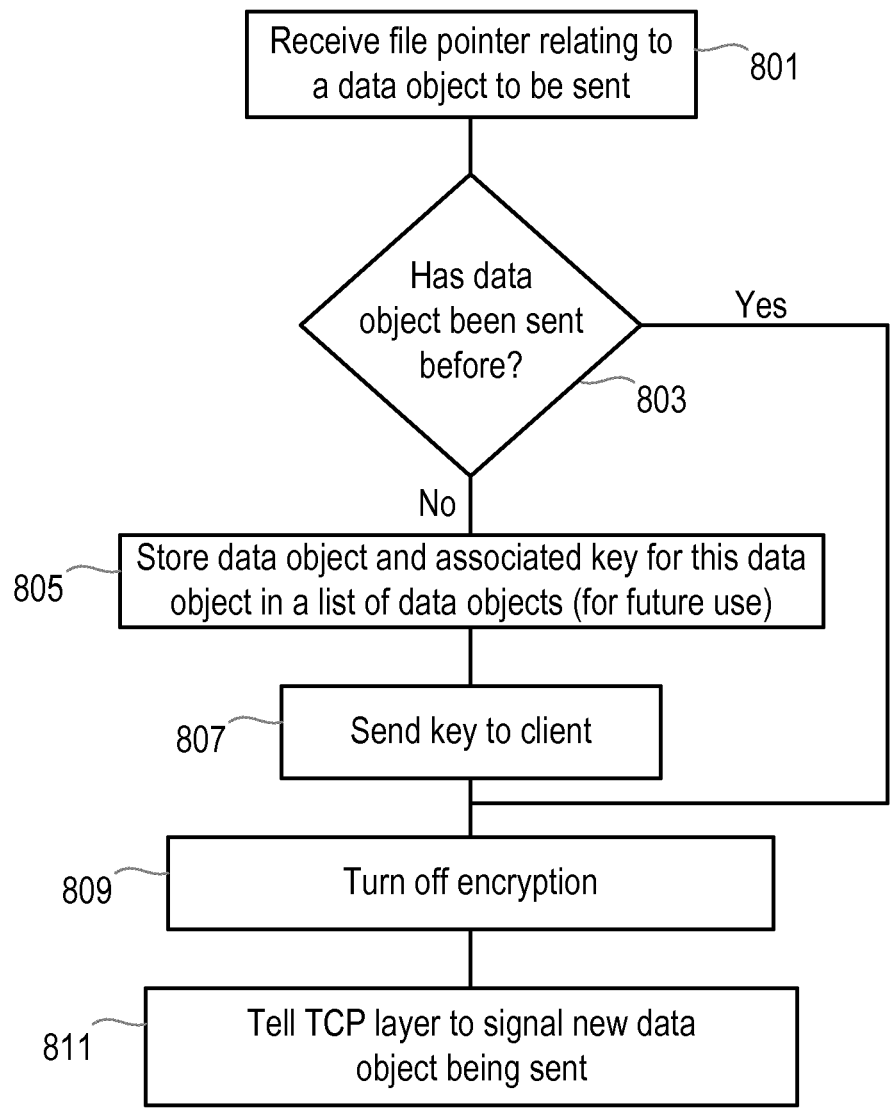
FIG. 8 shows an example of a method in a server node according to an embodiment.

Referring to FIG. 8, upon receiving information from the HTTP layer 11 that the data object is suitable for caching, e.g. upon receiving the file pointer to the file (data object) to be sent, step 801, the TLS layer 12 can check if that particular data object or file has already been sent before, step 803. If not, it stores the data object (e.g. the contents of the file, or actual data, and file pointer) and the corresponding encryption information (e.g. key) to use for this data object in a list of data objects, step 805. As a result of storing this information, the next time this data object is to be sent the TLS layer will know that the data object has already been sent, and might have been cached downstream.

After this the TLS client sends the key to use, down to the client, step 807. Then it turns off the crypto, step 809, and tells the TCP layer to signal a new data object is being sent, step 811.

The file is now sent from the TCP layer 13 of the server node 10 of FIG. 1 to the cache node 30, encrypted but with the TLS encryption turned off. For example, the object itself may be encrypted. That is, the normal TLS encryption (transport encryption) may be turned off, but the object data being transferred is encrypted with a common key. Alternatively the TLS may negotiate a "new" key (in all cases but the first they negotiate an old key) and the object is sent.

When the object is sent, the TLS layer 12 signals the TCP layer 13 to signal an end marker in the stream, i.e. an end of data object flag (for example using a TCP header bit) and normal status is resumed.

Figure 9:
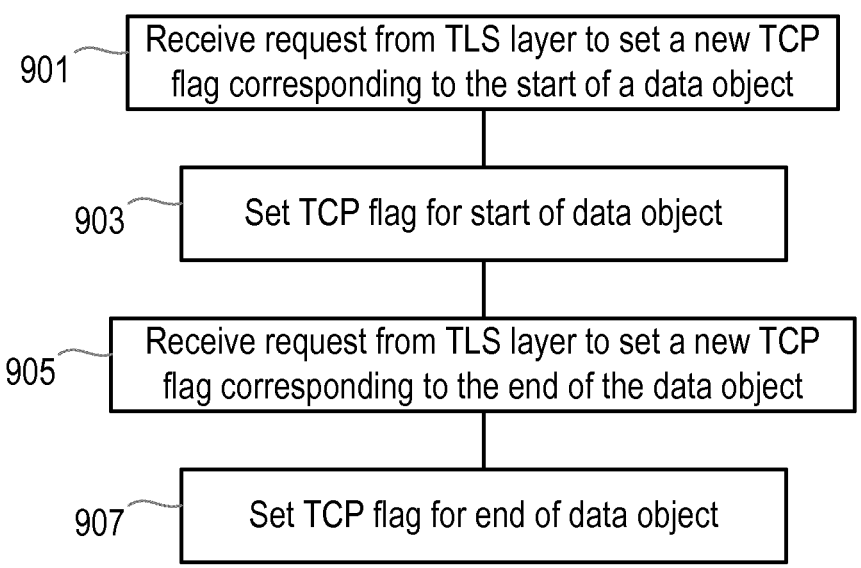
FIG. 9 shows an example of a method in a server node according to an embodiment.

Referring to FIG. 9, during the process above, at the TCP layer 13 in the server node 10, the TCP layer 13 receives a request to set a new TCP flag, step 901, and sets it, step 903. This defines the start of a data object. When the data object has been streamed, the TCP layer receives a signal to set another new TCP flag, step 905, and sets it, step 907. This corresponds to the end of a data object.

It is noted that the TCP layer on the client side may be adapted to work either as per the cache side, or adapted to ignore the flags.

It is also noted that the TLS layer on the client side may be adapted to detect that this is a data object when it is signaled and receives the keys for this data object, decrypts the data object, and sends the data object upwards.

It is noted that, in one embodiment, the behaviour at the HTTP layer 21 on the client side may be no different from normal behavior.

Figure 10:
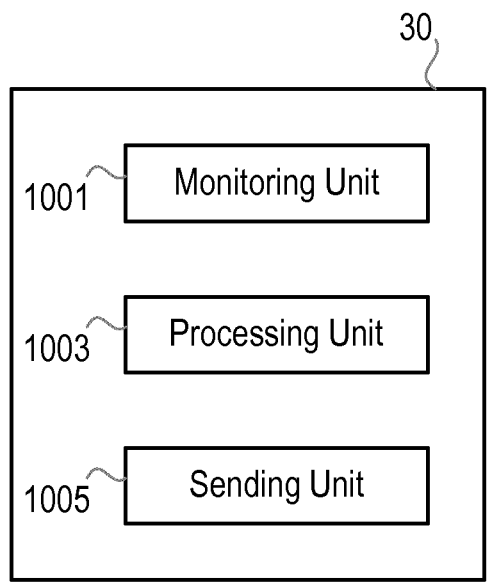
FIG. 10 shows an example of a cache node according to an embodiment.

FIG. 10 shows an example of a cache node 30 according to an embodiment. The cache node 30 comprises a monitoring unit 1001 adapted to monitor a secure data stream being received at the cache node from a server node. A processing unit 1003 is adapted to detect from one or more data chunks of the secure data stream that the secure data stream contains a data object that has been previously received and cached at the cache node. A sending unit 1005 is adapted to send a notification signal to the server node that the data object has been previously cached.

The processing unit 1003 may be further adapted to receive one or more encryption header portions from the server node, inserting a previously cached data chunk corresponding to each of the one or more encryption header portions into the data stream, and send the data stream to a client device. The processing unit 1003 may be further adapted to perform any of the method steps of the cache node as described herein.

Figure 11:
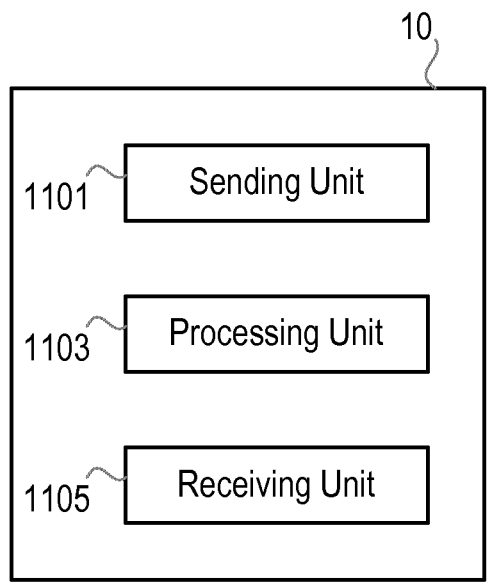
FIG. 11 shows an example of a server node according to an embodiment.

FIG. 11 shows an example of a server node 10 according to an embodiment. The server node 10 comprises a sending unit 1001 adapted to stream secure data relating to a data object via a cache node to a client device. A receiving unit 1105 is adapted to receive a notification signal from the cache node, the notification signal indicating that the secure data being streamed comprises a data object that has previously been cached at the cache node. A processing unit 1103 is adapted to control the sending unit 1001 to cease streaming one or more remaining data chunks of the data object in response to receiving the notification signal. The sending unit 1001 is further adapted to send one or more encryption header portions relating to each of the one or more remaining data chunks of the data object to the cache node. The processing unit 1103 may be further adapted to perform any of the method steps of the server node as described herein.

According to another embodiment, there is provided a computer program configured, when run on a computer, to carry out a method according to any one of the method steps described herein.

According to another embodiment, there is provided a computer program product comprising a computer readable medium and a computer program according to the paragraph above stored on the computer readable medium.

As can be seen from above, the embodiments described herein provide a control protocol between a streaming cache node having security, such as TLS, and the origin site.

The embodiments have the advantage of allowing secure data being streamed form a server node to a cache node to be cached, while still allowing a server node to maintain control.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a cache node of a network, the method comprising:
   monitoring, by the cache node, a secure data stream being received at the cache node from a server node;
   detecting, by the cache node, from one or more data chunks of the secure data stream that the secure data stream contains a data object that has been previously received and cached at the cache node;
   sending, by the cache node, a notification signal to the server node that the data object has been previously cached, wherein the notification signal further indicates number of remaining data chunks of the data object and identifiers of the remaining data chunks of the data object in the cache node;
   receiving, by the cache node, one or more encryption header portions relating to each of the remaining data chunks of the data object from the server node; and
   inserting, by the cache node, a previously cached data chunk corresponding to each of the one or more encryption header portions, relating to each of the remaining data chunks of the data object, into the secure data stream.

2. The method of claim 1, further comprising:
   sending the secure data stream to a client device.

3. The method of claim 1, wherein each encryption header portion relates to a corresponding data chunk that has been previously cached by the cache node.

4. The method of claim 1, wherein detecting whether the data object has been previously cached in the cache node comprises:
   detecting that a data object flag is set; and
   determining whether a file identifier indicated by the data object flag is already stored in the cache node.

5. The method of claim 4, wherein the data object flag is used to identify the start of a data object and the end of a data object.

6. The method of claim 1, wherein the one or more encryption header portions comprise transport layer security (TLS) header portions corresponding to a TLS layer.

7. The method of claim 4, wherein the data object flag comprises a flag of a transport control protocol (TCP) header.

8. The method of claim 1, wherein the method further comprises, as a result of detecting that the secure data stream being monitored does not relate to a data object that has been previously cached at the cache node,
   storing one or more data chunks corresponding to the data object, without any corresponding encryption header portions, in addition to sending the secure data stream to a client device.

9. A method in a server node of a network, the method comprising:
   streaming, by the server node, secure data relating to a data object via a cache node to a client device;
   receiving, by the server node, a notification signal from the cache node, the notification signal indicating that the secure data being streamed comprises a data object that has previously been cached at the cache node, wherein the notification signal further indicates number of one or more remaining data chunks of the data object and identifiers of the one or more remaining data chunks of the data object in the cache node;
   ceasing, by the server node, to stream the one or more remaining data chunks of the data object in response to receiving the notification signal; and
   sending, by the server node, one or more encryption header portions relating to each of the one or more remaining data chunks of the data object to the cache node.

10. The method of claim 9, wherein the method further comprises, after receiving the notification signal from the cache node, determining which encryption header portions relate to the one or more remaining data chunks of the data object, using one or more corresponding data chunk identifiers received from the cache node with the notification signal.

11. The method of claim 9, further comprising:
   receiving at a transport layer security (TLS) layer of the server node a file pointer relating to a data object to be sent;
   determining whether the data object has been sent before; and
   as a result of determining that the data object has not been sent before:
      storing the data object and an associated key for the data object in a list of data objects;
      sending the associated key to a client device;
      turning off encryption; and
      informing a transport control protocol (TCP) layer to signal that a new data object is being sent.

12. A cache node for a network, the cache node comprising a processor in communication with a memory storing instructions that when executed by the processor, cause the cache node to:
   monitor a secure data stream being received at the cache node from a server node;
   detect from one or more data chunks of the secure data stream that the secure data stream contains a data object that has been previously received and cached at the cache node;

send a notification signal to the server node that the data object has been previously cached, wherein the notification signal further indicates number of remaining data chunks of the data object and identifiers of the remaining data chunks of the data object in the cache node;

receive one or more encryption header portions relating to each of the remaining data chunks of the data object from the server node; and insert a previously cached data chunk corresponding to each of the one or more encryption header portions into the secure data stream.

13. The cache node of claim 12, wherein the instructions further cause the cache node to send the secure data stream to a client device.

14. A cache node adapted to perform the method of claim 3.

15. A server node for a network, the server node comprising a processor in communication with a memory storing instructions that when executed by the processor, cause the server node to:

stream secure data relating to a data object via a cache node to a client device;

receive a notification signal from the cache node, the notification signal indicating that the secure data being streamed comprises a data object that has previously been cached at the cache node, wherein the notification signal further indicates number of one or more remaining data chunks of the data object and identifiers of the one or more remaining data chunks of the data object in the cache node; and cease streaming the one or more remaining data chunks of the data object in response to receipt of the notification signal; and send one or more encryption header portions relating to each of the one or more remaining data chunks of the data object to the cache node.

16. The server node of claim 15, wherein the instructions further cause the server node to perform the method as defined in claim 9.

17. A computer program product comprising a non-transitory computer readable medium storing a computer program configured, when run on a computer, to carry out the method of claim 1.

18. A computer program product comprising a non-transitory computer readable medium storing a computer program configured, when run on a computer, to carry out the method of claim 9.

* * * * *